(No Model.)

A. CREECH.
CULTIVATOR.

No. 251,527.  Patented Dec. 27, 1881.

WITNESSES
Villette Anderson.
Philip C. Masi.

INVENTOR
A. Creech,
by Anderson & Smith
his ATTORNEYS

UNITED STATES PATENT OFFICE.

ALONZO CREECH, OF CLAYTON, NORTH CAROLINA.

CULTIVATOR.

SPECIFICATION forming part of Letters Patent No. 251,527, dated December 27, 1881.

Application filed July 30, 1881. (No model.)

*To all whom it may concern:*

Be it known that I, ALONZO CREECH, a citizen of the United States, resident of Clayton, in the county of Johnston and State of North Carolina, have invented a new and valuable Improvement in Cultivators; and I do hereby declare that the following is a full, clear, and exact description of the construction and operation of the same, reference being had to the annexed drawings, making a part of this specification, and to the letters and figures of reference marked thereon.

Figure 1:
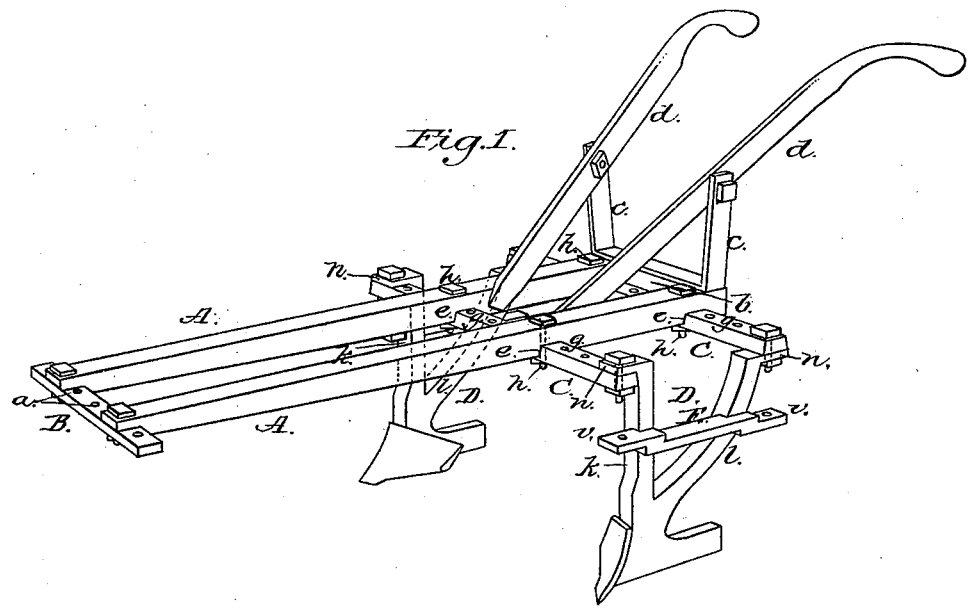
Figure 2:
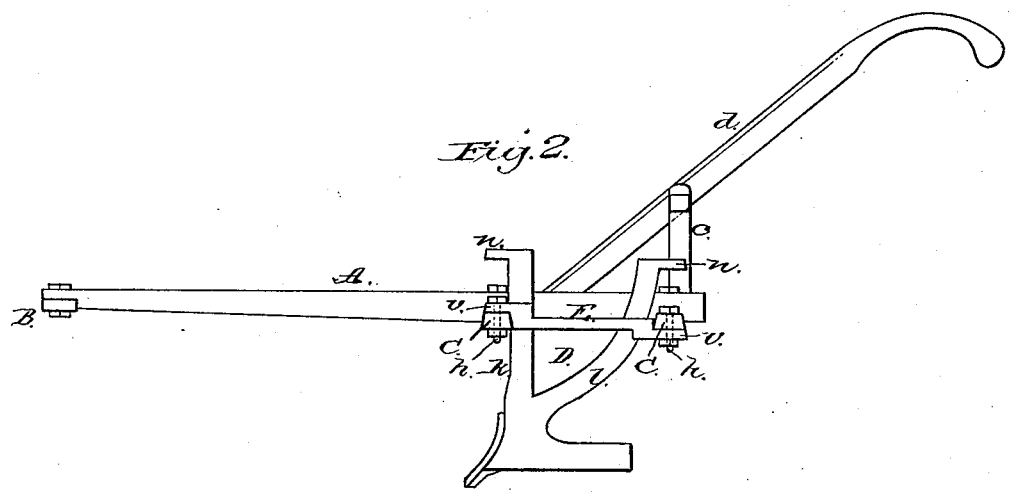

Figure 1 of the drawings is a representation of a perspective view of my invention, and Fig. 2 is a side view.

This invention has relation to improvements in cultivators for cotton and grain; and it consists in the construction and novel arrangement of parts, as hereinafter set forth and claimed.

In the accompanying drawings, the letters A A indicate the two main or draft beams of the frame, which are arranged parallel with each other, and are connected in front by a cross-bar, B, having a series of perforations, $a$, and serving for the clevis attachment. The rear ends of these beams may be connected by a cross-bar, $b$, and arms $c$ are arranged in rear to support the handles $d$. Transverse notches or gains $e$ are formed in the under sides of the beams A to receive the adjustable transverse bars C, which are provided with series of perforations $g$, and are connected to said beams by means of bolts $h$. The bars C are parallel to each other, one being in front of the other, and they are arranged at the rear portions of said beams, as indicated in the drawings.

D D indicate the standards carrying the plows or shovels. These standards have each two branches, $k$ and $l$, arranged one in front of the other, the front branch being straight and the rear branch usually curved and obliquely arranged with reference to the front branch. These branches are provided with flanges or heads $n$ at their upper ends, whereby they can be secured to the cross-beams C, the flanges being applied over the front beam and under the rear bar, so as to relieve the strain on the fastening-bolts.

Below the end flanges of the branches is provided, in connection with the standard, a tie-bar and bearing, E, the ends $v$ of which extend respectively in front and in rear, and are designed respectively to bear on and under the front and rear transverse bars, C, when the frame of the cultivator is lowered on the standards, to lighten the draft in cultivating plants which are young and small.

The standards D are readily adjusted transversely, and may be interchanged, so as to convert a side cultivator to a middle sweep.

Having described this invention, what I claim, and desire to secure by Letters Patent, is—

1. In a cultivator having the parallel beams A and perforated transverse bars C, the combination of the branched standards D, having the end flanges, $n$, and the tie-bearings E below said end flanges, connecting the branches of the standard, substantially as specified.

2. The combination, with the interchangeable and adjustable branched standards D and the tie-bearings E, of the parallel beams A and their transverse bars C, forming a frame vertically adjustable with reference to said standards, substantially as specified.

In testimony that I claim the above I have hereunto subscribed my name in the presence of two witnesses.

ALONZO CREECH.

Witnesses:
JAMES E. PAGE,
EDWARD H. G. BAGWELL.